(12) United States Patent
Reisenberger et al.

(10) Patent No.: US 10,598,105 B2
(45) Date of Patent: Mar. 24, 2020

(54) METHOD FOR CONTROLLING A FORCED INDUCTION ENGINE

(71) Applicant: BOMBARDIER RECREATIONAL PRODUCTS INC., Valcourt (CA)

(72) Inventors: Christian Reisenberger, Altmuenster (AT); Frederic Morin, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 128 days.

(21) Appl. No.: 15/510,365

(22) PCT Filed: Sep. 14, 2015

(86) PCT No.: PCT/IB2015/057048
§ 371 (c)(1),
(2) Date: Mar. 10, 2017

(87) PCT Pub. No.: WO2016/038591
PCT Pub. Date: Mar. 17, 2016

(65) Prior Publication Data
US 2017/0248087 A1    Aug. 31, 2017

Related U.S. Application Data

(60) Provisional application No. 62/049,706, filed on Sep. 12, 2014.

(51) Int. Cl.
*F02D 41/00*    (2006.01)
*F02D 11/10*    (2006.01)
(Continued)

(52) U.S. Cl.
CPC .......... *F02D 41/0007* (2013.01); *F02B 29/04* (2013.01); *F02D 9/08* (2013.01);
(Continued)

(58) Field of Classification Search
CPC ...... F02D 41/0007; F02D 9/08; F02D 11/105; F02D 41/0002; F02D 2200/0402;
(Continued)

(56) References Cited

U.S. PATENT DOCUMENTS 4,580,541 A  *  4/1986  Koumura ................ F02D 43/00
                                                          123/478
5,615,657 A       4/1997  Yoshizawa
(Continued)

OTHER PUBLICATIONS

International Search Report of PCT/IB2015/057048; Blaine Copenheaver; dated Dec. 28, 2015.

*Primary Examiner* — Joseph J Dallo
*Assistant Examiner* — Yi-Kai Wang
(74) *Attorney, Agent, or Firm* — BCF LLP

(57) ABSTRACT

A method for controlling a forced induction engine includes: determining a first air pressure upstream of an air compressor, the air compressor supplying compressed air to the engine; determining a second air pressure downstream of the air compressor; determining a limit air flow rate to the engine corresponding to the surge limit of the air compressor based at least in part on the first and second air pressures; and controlling a throttle valve actuator to position the throttle valve at a position providing an air flow rate that is greater than or equal to the limit air flow rate. A vehicle power pack having a control unit implementing the method and a vehicle having the vehicle power pack are also disclosed.

24 Claims, 10 Drawing Sheets

(51) Int. Cl.
*F02B 29/04* (2006.01)
*F02D 9/08* (2006.01)

(52) U.S. Cl.
CPC ........ *F02D 11/105* (2013.01); *F02D 41/0002* (2013.01); *F02D 2200/0402* (2013.01); *F02D 2200/0404* (2013.01); *F02D 2200/0406* (2013.01); *Y02T 10/144* (2013.01); *Y02T 10/146* (2013.01); *Y02T 10/42* (2013.01)

(58) Field of Classification Search
CPC ..... F02D 2200/0404; F02D 2200/0406; F02B 29/04; Y02T 10/144; Y02T 10/146; Y02T 10/42
USPC .................................................. 123/406.45
See application file for complete search history.

(56) References Cited

U.S. PATENT DOCUMENTS

| | | | |
|---|---|---|---|
| 6,240,899 B1 | 6/2001 | Yamada et al. | |
| 7,079,937 B2 | 7/2006 | Tanaka | |
| 7,801,665 B2 | 9/2010 | Buckland et al. | |
| 8,352,152 B2 | 1/2013 | Serres | |
| 8,677,751 B2 | 3/2014 | Vandyne et al. | |
| 2003/0045400 A1* | 3/2003 | Ito | B60W 10/06 477/176 |
| 2006/0116808 A1* | 6/2006 | Tanaka | F02D 41/18 701/102 |
| 2006/0157026 A1* | 7/2006 | Ishida | F02D 9/1065 123/396 |
| 2008/0189026 A1* | 8/2008 | Takamiya | F01L 1/34 701/103 |
| 2012/0304640 A1 | 12/2012 | Tsuyuki | |
| 2013/0073187 A1 | 3/2013 | Koch | |
| 2013/0220284 A1 | 8/2013 | Katsumata et al. | |
| 2013/0245916 A1 | 9/2013 | Kurashima | |
| 2015/0047343 A1* | 2/2015 | McConville | F02B 47/08 60/600 |
| 2015/0047605 A1* | 2/2015 | Buckland | F02B 37/164 123/403 |
| 2016/0061104 A1* | 3/2016 | Hirayama | F02D 41/12 60/602 |
| 2017/0145907 A1* | 5/2017 | Nishio | F02D 41/0007 |

* cited by examiner

METHOD FOR CONTROLLING A FORCED INDUCTION ENGINE

CROSS-REFERENCE

The present application claims priority to U.S. Provisional Application No. 62/049,706, filed Sep. 12, 2014, the entirety of which is incorporated herein by reference.

TECHNICAL FIELD

The present technology relates to a method for controlling a forced induction engine.

BACKGROUND

In order to increase the power output and efficiency of an internal combustion engine, some engine power packs use an air compressor to deliver compressed air to the intake of the engine. Engines provided with such a system are typically referred to as forced induction engines. Engines that do not have forced inductions are typically referred to as naturally aspirated engines.

One example of an air compressor is a turbocharger. In a turbocharger, the exhaust gases from the engine turn a turbine which compresses the air to be supplied to the engine. In a turbocharged engine, the desired compression pressure is reached when the combination of engine speed and throttle angle provide sufficient exhaust flow to the turbine and therefore the necessary energy for the compressor to deliver the air intake flow to the engine at the desired pressure.

The pressure ratio at the compressor (i.e. the ratio of the output air pressure of the compressor over the input air pressure of the compressor) is an important parameter to monitor in order to avoid surging.

Compressor surge is a condition which is reached when the engine's air consumption is suddenly interrupted while the compressor supplies a large flow of compressed air. For example, when the engine is operated with the throttle valve wide open, a lot of air is supplied to the engine. Should the user release the throttle operator completely, as shown in FIG. 7, the throttle valve closes to its idle position, as shown in FIG. 8. An example of throttle operator is a throttle pedal. Even though the throttle valve closes almost immediately, the components of the air compressor have inertia and will take some time to reduce their speeds. This condition where a high pressure ratio in conjunction with a low air flow creates pressure surges that can potentially damage the air compressor. These air pressure surges also generate noise that can be heard and which can be a nuisance to a user of a vehicle having the engine.

The conditions that can potentially damage an air compressor due to pressure surge vary from one compressor to the other. As such, the technical specifications of most air compressors include a graph illustrating a surge limit line. The graph illustrates the surge limit line in terms of flow rate versus pressure ratio. FIG. 5 illustrates such a graph for an exemplary compressor. In this graph, the horizontal axis corresponds to the air flow rate and the vertical axis corresponds to the pressure ratio P3/P2, where P3 is the air pressure downstream of the air compressor and P2 is the air pressure upstream of the air compressor. The surge limit line is shown as a dashed line. When the air compressor operates under the conditions corresponding to the region to the right of the surge limit line, no damage to the air compressor should occur due to pressure surge. When the air compressor operates under the conditions corresponding to the region to the left of the surge limit line, damage to the air compressor due to pressure surge may occur.

In FIG. 5, the dash-dot line illustrates a case where the throttle valve is wide open and is then suddenly closed to its idle position as shown in FIG. 8. When the throttle valve is wide open, the air compressor operates at the rightmost point of the dash-dot line. When the throttle valve is closed, the flow rate decreases and the pressure ratio initially increases before decreasing as can be seen by following the arrows on the dash-dot line. As can be also seen, the dash-dot line crosses the dashed surge limit line and extends to the left thereof. As a result, the operating conditions of the air compressor could cause pressure surge to damage the air compressor.

In order to address the issue of damage and noise resulting from pressure surge, many engines are provided with a bypass valve upstream of the throttle valve. In such implementations, when the pressure upstream of the throttle valve becomes too high, the bypass valve opens thereby releasing some of the pressure. From the bypass valve, the air is exhausted to the atmosphere or returned upstream of the air compressor. The dotted line in FIG. 5 illustrates a case where the throttle valve is wide open and is then suddenly closed completely where a bypass valve is provided. As can be seen, the dotted line does not cross the surge limit line, and the compressor is therefore unlikely to suffer damage due to pressure surge.

Although the bypass valve helps reduce the likelihood of damage to the air compressor and noise due to air pressure surge, the bypass valve adds weight, cost and assembly complexity to the power pack in which it is provided.

It would therefore be desirable to provide a solution to the problem of damage caused to air compressors due to air pressure surge and to the problem of the noise generated due to air pressure surge that does not require a bypass valve.

SUMMARY

It is an object of the present technology to ameliorate at least some of the inconveniences present in the prior art.

According to an aspect of the present technology, there is provided a method for controlling a forced induction engine comprising: determining a first air pressure upstream of an air compressor, the air compressor supplying compressed air to the engine; determining a second air pressure downstream of the air compressor; determining a limit air flow rate to the engine corresponding to the surge limit of the air compressor based at least in part on the first and second air pressures; and controlling a throttle valve actuator to position the throttle valve at a position providing an air flow rate that is greater than or equal to the limit air flow rate.

According to some implementations of the present technology, the method further comprises: determining an engine speed; and determining a limit position of a throttle valve of the engine based at least in part on the engine speed and the limit air flow rate, the limit position of the throttle valve being a position of the throttle valve below which a surge limit of the air compressor is exceeded. Controlling the throttle valve actuator to position the throttle valve at the position providing an air flow rate that is greater than or equal to the limit air flow rate includes controlling the throttle valve actuator to position the throttle valve at a position being greater than or equal to the limit position.

According to some implementations of the present technology, the limit position is an idle position when a ratio of the second air pressure over the first air pressure is below a predetermined value.

According to some implementations of the present technology, determining the first air pressure includes determining a third air pressure upstream of an air filter, the air filter being disposed upstream of the air compressor.

According to some implementations of the present technology, wherein determining the second air pressure includes sensing a third air pressure downstream of an air cooler, the air cooler being disposed downstream of the air compressor.

According to some implementations of the present technology, the air cooler is disposed upstream of the throttle valve.

According to some implementations of the present technology, the method further comprises determining an atmospheric air pressure. The limit position of the throttle valve of the engine is based at least in part on the atmospheric air pressure.

According to some implementations of the present technology, the limit air flow rate is based at least in part on a ratio of the second air pressure over the first air pressure.

According to some implementations of the present technology, the method further comprises: determining a throttle operator position; and determining a desired throttle valve position based at least in part on the throttle operator position. Controlling the throttle valve actuator to position the throttle valve at the position being greater than or equal to the limit position comprises: controlling the throttle valve actuator to position the throttle valve at the desired throttle valve position if the desired throttle valve position is greater than the limit position; and controlling the throttle valve actuator to position the throttle valve to a position other than the desired throttle valve if the desired throttle valve position is less than the limit position, the position other than the desired throttle valve being greater than or equal to the limit position.

According to some implementations of the present technology, controlling the throttle valve actuator to position the throttle valve at the desired throttle valve position if the desired throttle valve position is greater than the limit position includes controlling the throttle valve actuator to position the throttle valve at the desired throttle valve position if the desired throttle valve position is greater than a control position of the throttle valve, the control position of the throttle valve being greater than the limit position. Controlling the throttle valve actuator to position the throttle valve to the position other than the desired throttle valve if the desired throttle valve position is less than the limit position includes controlling the throttle valve actuator to position the throttle valve to the control position if the desired throttle valve position is less than the control position.

According to some implementations of the present technology, the method further comprises retarding an ignition timing of the engine if the desired throttle valve position is less than the limit position.

According to some implementations of the present technology, the method further comprises stopping fuel injection if the desired throttle valve position is less than the limit position.

According to another aspect of the present technology, there is provided a vehicle power pack having an engine; a throttle body fluidly connected to the engine, the throttle body including a throttle valve, the throttle valve being movable to control a flow of air to the engine; a throttle valve actuator operatively connected to the throttle valve; a control unit connected to the throttle valve actuator to control an operation of the throttle valve actuator; a throttle valve position sensor connected to the control unit, the throttle valve position sensor sensing a position of the throttle valve and sending a signal representative of the position of the throttle valve to the control unit; an engine speed sensor connected to the control unit, the engine speed sensor sensing an engine speed and sending a signal representative of the engine speed to the control unit; an air compressor fluidly connected to the throttle body for supplying compressed air to the throttle body; and at least one air pressure sensor connected to the control unit, the at least one air pressure sensor sensing at least air pressure downstream of the air compressor and sending a signal representative of at least the air pressure downstream of the air compressor to the control unit. The control unit is adapted for determining a first air pressure upstream of the air compressor and a second air pressure downstream of the air compressor based at least in part on the signal from the at least one air pressure sensor. The control unit is adapted for sending control signals to the throttle valve actuator based at least in part on the first and second air pressures. The control signals cause the throttle valve actuator to position the throttle valve at a position providing an air flow rate that is greater than or equal to a limit air flow rate. The limit air flow rate is an air flow rate below which a surge limit of the air compressor is exceeded for the first and second air pressures.

According to some implementations of the present technology, an air filter is fluidly connected to the air compressor upstream of the air compressor.

According to some implementations of the present technology, an air cooler is fluidly connected to the air compressor downstream of the air compressor and fluidly connected to the throttle body upstream of the throttle body. The at least one air pressure sensor senses a third air pressure downstream of the air cooler and upstream of the throttle body.

According to some implementations of the present technology, a throttle operator position sensor is connected to the control unit. The throttle operator position sensor is adapted for sensing a position of a throttle operator of the vehicle and for sensing a signal representative of the throttle operator position to the control unit. The control unit is further adapted for sending control signals to the throttle valve actuator based on the signal of the throttle operator position sensor. The control signals cause the throttle valve actuator to position the throttle valve at a desired throttle valve position if the desired throttle valve position is greater than the position providing the air flow rate that is greater than or equal to the limit air flow rate. The desired throttle valve position is a throttle valve position corresponding to the throttle operator position sensed by the throttle position sensor. The control signals causing the throttle valve actuator to position the throttle valve to a position other than the desired throttle valve position if the desired throttle valve position is less than the position providing the air flow rate that is greater than or equal to the limit air flow rate, the position other than the desired throttle valve providing the air flow rate that is greater than or equal to the limit air flow rate.

According to another aspect of the present technology, there is provided a vehicle having a frame; at least one ground engaging member operatively connected to the frame; and the vehicle power pack described above. The engine is connected to the frame and is connected to at least one of the at least one ground engaging member.

According to some implementations of the present technology, there is provided a method for controlling a forced induction engine comprising: determining a first air pressure upstream of an air compressor, the air compressor supplying compressed air to the engine; determining a second air pressure downstream of the air compressor; determining an engine speed; determining a limit position of a throttle valve of the engine based at least in part on the engine speed, the first air pressure and the second air pressure, the limit position of the throttle valve being a position of the throttle valve below which a surge limit of the air compressor is exceeded; and controlling a throttle valve actuator to position the throttle valve at a position being greater than or equal to the limit position.

According to some implementations of the present technology, the method further comprises determining a limit air flow rate to the engine corresponding to the surge limit of the air compressor based at least in part on the first and second air pressures. Determining the limit position of a throttle valve of the engine is based at least in part on the limit air flow rate.

According to some implementations of the present technology, the limit position is an idle position when a ratio of the second air pressure over the first air pressure is below a predetermined value.

According to some implementations of the present technology, determining the first air pressure includes determining a third air pressure upstream of an air filter, the air filter being disposed upstream of the air compressor.

According to some implementations of the present technology, determining the second air pressure includes sensing a third air pressure downstream of an air cooler, the air cooler being disposed downstream of the air compressor.

According to some implementations of the present technology, the air cooler is disposed upstream of the throttle valve.

According to some implementations of the present technology, the method further comprises determining an atmospheric air pressure. The limit position of the throttle valve of the engine is based at least in part on the atmospheric air pressure.

According to some implementations of the present technology, the limit air flow rate is based at least in part on a ratio of the second air pressure over the first air pressure.

According to some implementations of the present technology, the method further comprises determining a throttle operator position; and determining a desired throttle valve position based at least in part on the throttle operator position. Controlling the throttle valve actuator to position the throttle valve at the position being greater than or equal to the limit position comprises: controlling the throttle valve actuator to position the throttle valve at the desired throttle valve position if the desired throttle valve position is greater than the limit position; and controlling the throttle valve actuator to position the throttle valve to a position other than the desired throttle valve if the desired throttle valve position is less than the limit position, the position other than the desired throttle valve being greater than or equal to the limit position.

According to some implementations of the present technology, controlling the throttle valve actuator to position the throttle valve at the desired throttle valve position if the desired throttle valve position is greater than the limit position includes controlling the throttle valve actuator to position the throttle valve at the desired throttle valve position if the desired throttle valve position is greater than a control position of the throttle valve, the control position of the throttle valve being greater than the limit position. Controlling the throttle valve actuator to position the throttle valve to the position other than the desired throttle valve if the desired throttle valve position is less than the limit position includes controlling the throttle valve actuator to position the throttle valve to the control position if the desired throttle valve position is less than the control position.

According to some implementations of the present technology, the method further comprises retarding an ignition timing of the engine if the desired throttle valve position is less than the limit position.

According to some implementations of the present technology, the method further comprises stopping fuel injection if the desired throttle valve position is less than the limit position.

According to another aspect of the present technology, there is provided a vehicle power pack having an engine; a throttle body fluidly connected to the engine, the throttle body including a throttle valve, the throttle valve being movable to control a flow of air to the engine; a throttle valve actuator operatively connected to the throttle valve; a control unit connected to the throttle valve actuator to control an operation of the throttle valve actuator; a throttle valve position sensor connected to the control unit, the throttle valve position sensor sensing a position of the throttle valve and sending a signal representative of the position of the throttle valve to the control unit; an engine speed sensor connected to the control unit, the engine speed sensor sensing an engine speed and sending a signal representative of the engine speed to the control unit; an air compressor fluidly connected to the throttle body for supplying compressed air to the throttle body; and at least one air pressure sensor connected to the control unit, the at least one air pressure sensor sensing at least one air pressure downstream of the air compressor and sending a signal representative of at least the air pressure downstream of the air compressor to the control unit. The control unit is adapted for determining a first air pressure upstream of the air compressor and a second air pressure downstream of the air compressor based at least in part on the signal from the at least one air pressure sensor. The control unit being adapted for sending control signals to the throttle valve actuator based at least in part on the signals of the engine speed sensor, and the first and second air pressures. The control signals causing the throttle valve actuator to position the throttle valve at a position being greater than or equal to a limit position of the throttle valve. The limit position of the throttle valve is a position of the throttle valve below which a surge limit of the air compressor is exceeded.

According to some implementations of the present technology, an air filter is fluidly connected to the air compressor upstream of the air compressor.

According to some implementations of the present technology, an air cooler is fluidly connected to the air compressor downstream of the air compressor and fluidly connected to the throttle body upstream of the throttle body. The at least one air pressure sensor senses a third air pressure downstream of the air cooler and upstream of the throttle body.

According to some implementations of the present technology, a throttle operator position sensor is connected to the control unit. The throttle operator position sensor is adapted for sensing a position of a throttle operator of the vehicle and for sending a signal representative of the throttle operator position to the control unit. The control unit is further adapted for sending control signals to the throttle valve actuator based on the signal of the throttle operator position sensor. The control signals cause the throttle valve actuator to position the throttle valve at a desired throttle valve position if the desired throttle valve position is greater than the limit position. The desired throttle valve position is a throttle valve position corresponding to the throttle operator position sensed by the throttle position sensor. The control signals cause the throttle valve actuator to position the throttle valve to a position other than the desired throttle valve position if the desired throttle valve position is less than the limit position. The position other than the desired throttle valve is greater than or equal to the limit position.

According to another aspect of the present technology, there is provided a vehicle having a frame; at least one ground engaging member operatively connected to the frame; and the vehicle power pack described above. The engine is connected to the frame and is connected to at least one of the at least one ground engaging member.

For purposes of this application terms related to spatial orientation such as forwardly, rearward, left, and right, are as they would normally be understood by a driver of the vehicle sitting thereon in a normal driving position. Also for purposes of this application, the term "upstream" refers to an element being disposed prior to another with respect to a normal direction of flow of a stream and the term "downstream" refers to an element being disposed after another with respect to a normal direction of flow of a stream. Also, for purposes of this application, the terms "above", "higher" and "greater than" when referring to a position of the throttle valve compared to another position of the throttle valve mean a position of the throttle valve where the throttle valve is more opened than at the other position. Similarly the terms "below", "lower" and "less than" when referring to a position of the throttle valve compared to another position of the throttle valve mean a position of the throttle valve where the throttle valve is less opened than at the other position. Also for purposes of this application, the term "wide open" in reference to a position of the throttle valve refers to the position of the throttle valve at which the throttle valve provides the greatest possible air flow through the throttle body for this particular throttle body. Similarly, the terms "minimum" and "idle" in reference to a position of the throttle valve refer to the position of the throttle valve at which the throttle valve provides the smallest possible air flow to the engine through the throttle body to provide the engine with sufficient air, and this value depends on engine speed. The terms "minimum" and "idle" in reference to a position of the throttle valve do not necessarily refer to the position of the throttle valve at which the throttle valve provides the minimum air flow for this particular throttle body as this may not be sufficient to provide the engine with enough air, depending on engine speed. For example, in one implementation, the idle position of the throttle valve is around 3 percent with the engine operating at idle speed, and this value increases with engine speed in order to provide the engine with enough air in coasting conditions.

Examplary implementations of the present vehicle have at least one of the above-mentioned aspects, but do not necessarily have all of them. It should be understood that examplary implementations of the present vehicle may have other aspects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with reference to a side-by-side recreational utility vehicle (RUV) 10. However, it is contemplated that aspects of the RUV 10 could be used in other types of vehicles having a forced induction engine such as a straddle-type all-terrain vehicle (ATV), a snowmobile, a motorcycle, a three-wheeled vehicle, a boat having an inboard or outboard engine, and a personal watercraft to name a few.

Figure 1:
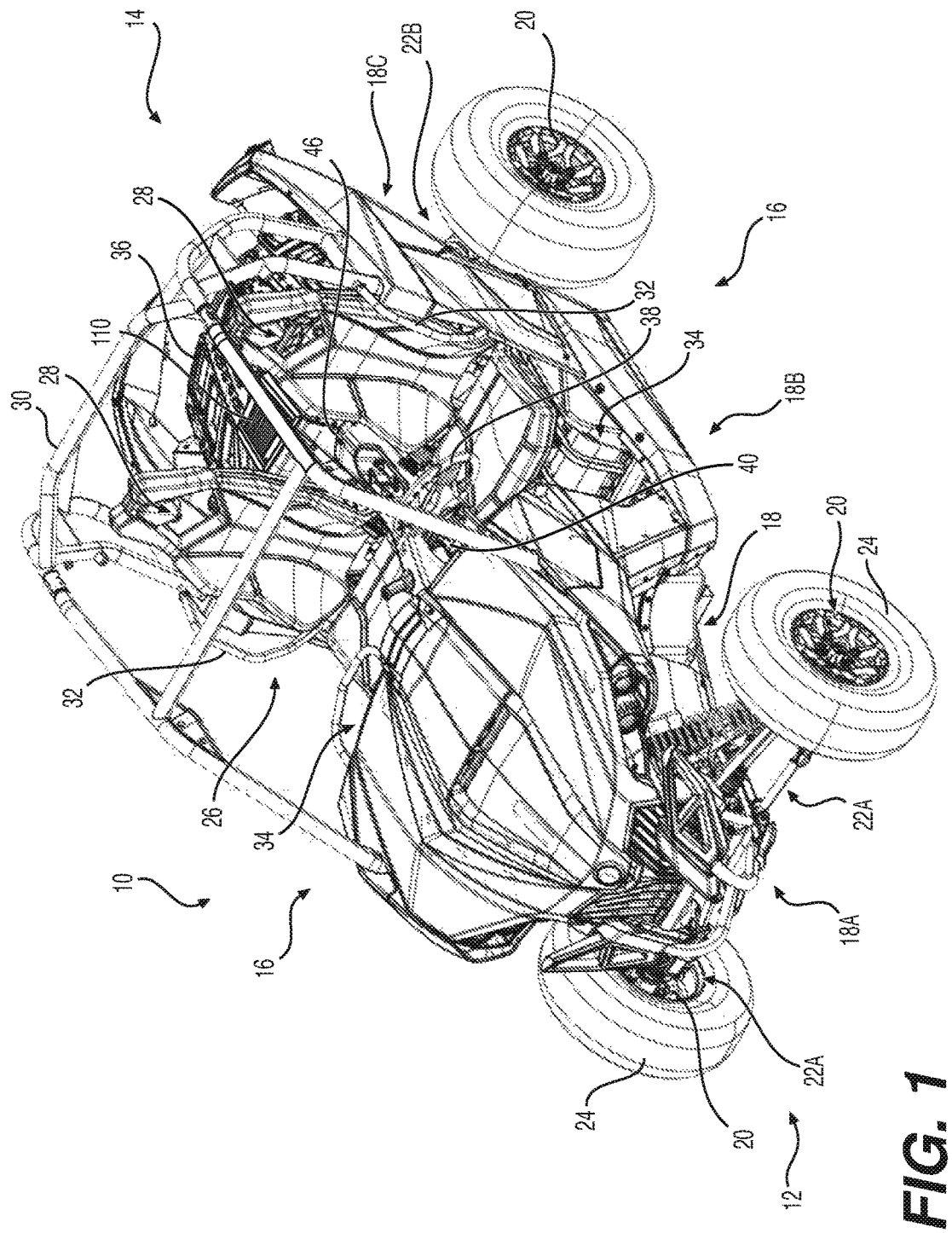
FIG. 1 is a perspective view taken from a front, left side of a RUV.

FIG. 1 illustrates the RUV 10. The RUV 10 has a front end 12, a rear end 14, and two lateral sides 16 (left and right). The RUV 10 includes a frame 18 to which a vehicle body is mounted. The frame 18 has a front portion 18A, a middle portion 18B and a rear portion 18C. A pair of front wheels 20 is suspended from the front portion 18A of the frame 18 via front suspension assemblies 22A. A pair of rear wheels 20 is suspended from the rear portion 18C of the frame 18 via rear suspension assemblies 22B. Each of the four wheels 20 has a tire 24. A cockpit area 26 is disposed in the middle portion 18B of the frame 18. The cockpit area 26 comprises two seats 28 (left and right). Each seat 28 is a bucket seat having a seat base and a backrest. It is contemplated that the seats 28 could be other types of recumbent seats. Each seat 28 is also provided with a seat belt (not shown). The left and right seats 28 are mounted laterally beside each other to accommodate a driver and a passenger (riders), respectively, of the RUV 10.

A roll cage 30 is connected to the frame 18 and is disposed above the cockpit area 26. The roll cage 30 is an arrangement of metal tubes that contributes to protecting the riders.

The roll cage 30 has several attachment points to the frame 18. The roll cage 30 further includes a pair of lateral restraining members 32, one on each side of a rear part of the roll cage 30. The lateral restraining members 32 extend forward from the rear part of the roll cage 30. The lateral restraining members 32 are U-shaped tubes which help protect an upper body of the riders. It is contemplated that the lateral restraining members 32 could have a different shape. It is also contemplated that the restraining members 32 could be omitted.

The cockpit area 26 is open at the two lateral sides 16 of the RUV 10, forming two lateral passages 34 (left and right), through which the riders can ingress and egress the RUV 10. A lateral cover (not shown) is selectively disposed across each lateral passage 34. The lateral covers are made of flexible straps and flexible panels of meshed material. When the riders are riding the RUV 10, the lateral covers are intended to be disposed across the lateral passages 34. However, when the riders are not riding the RUV 10 and they desire to either ingress or egress the cockpit area 26, the lateral covers can be opened to clear the lateral passages 34.

A cargo rack 36 is mounted to the rear portion 18C of the frame 18 rearward of the seats 28. It is contemplated that the cargo rack 36 could be replaced by a cargo box pivotally mounted to the rear portion 18C of the frame 18 rearward of the seats 28. It is contemplated that the cargo rack 36 could be omitted.

A steering device 38 including a steering wheel is disposed in front of the left seat 28. It is contemplated that, the steering wheel could be disposed in front of the right seat 28. The steering device 38 is operatively connected to the two front wheels 20 to permit steering of the RUV 10. A display cluster 40 is disposed in front of the steering wheel of the steering device 38. A throttle operator in the form of a throttle pedal 42 (shown in FIG. 2A) is disposed on the floor of the cockpit area 26 below the steering wheel and in front of the corresponding seat 28.

Figure 2A:
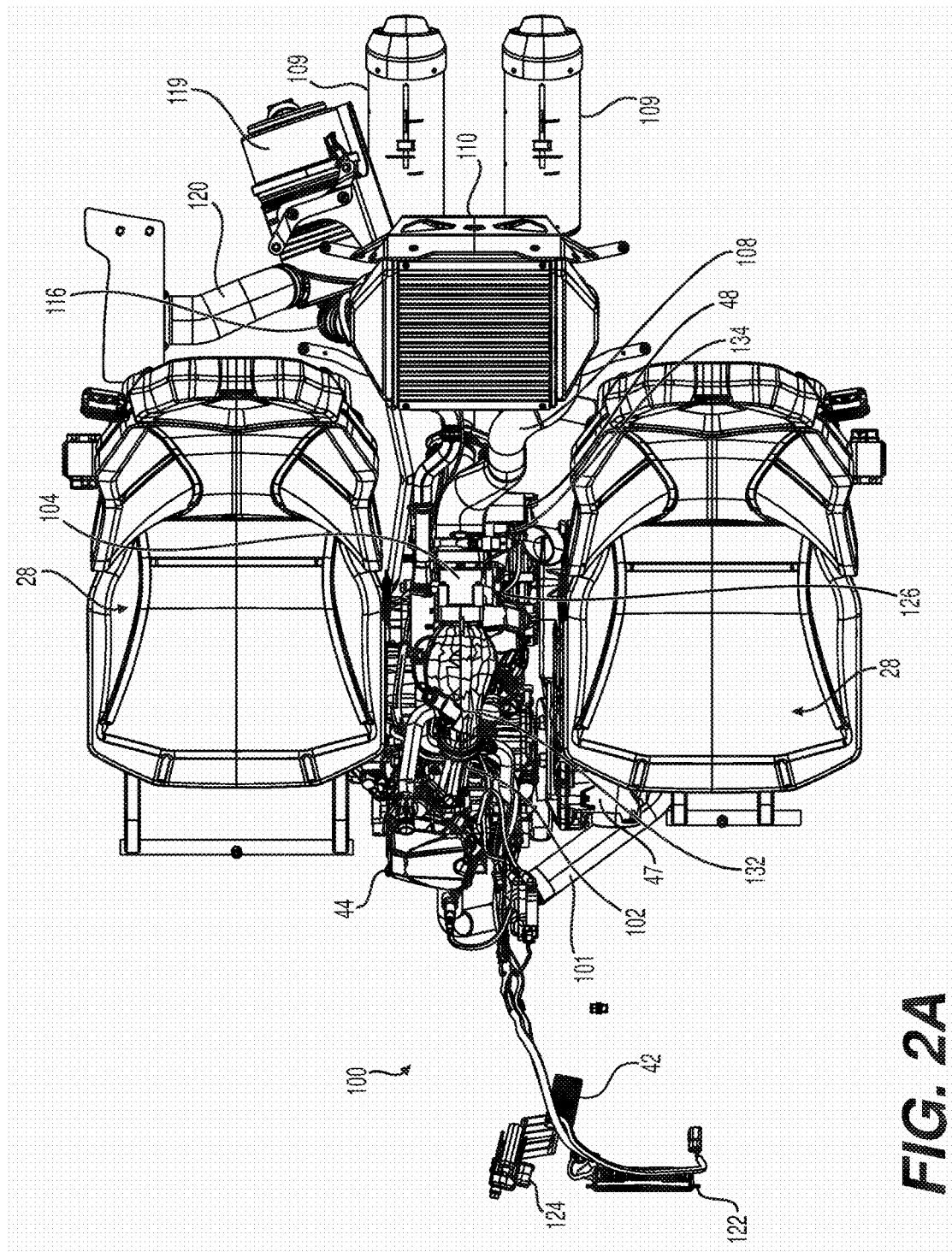
FIG. 2A is top plan view of a power pack and seats of the RUV of FIG. 1.
Figure 2B:
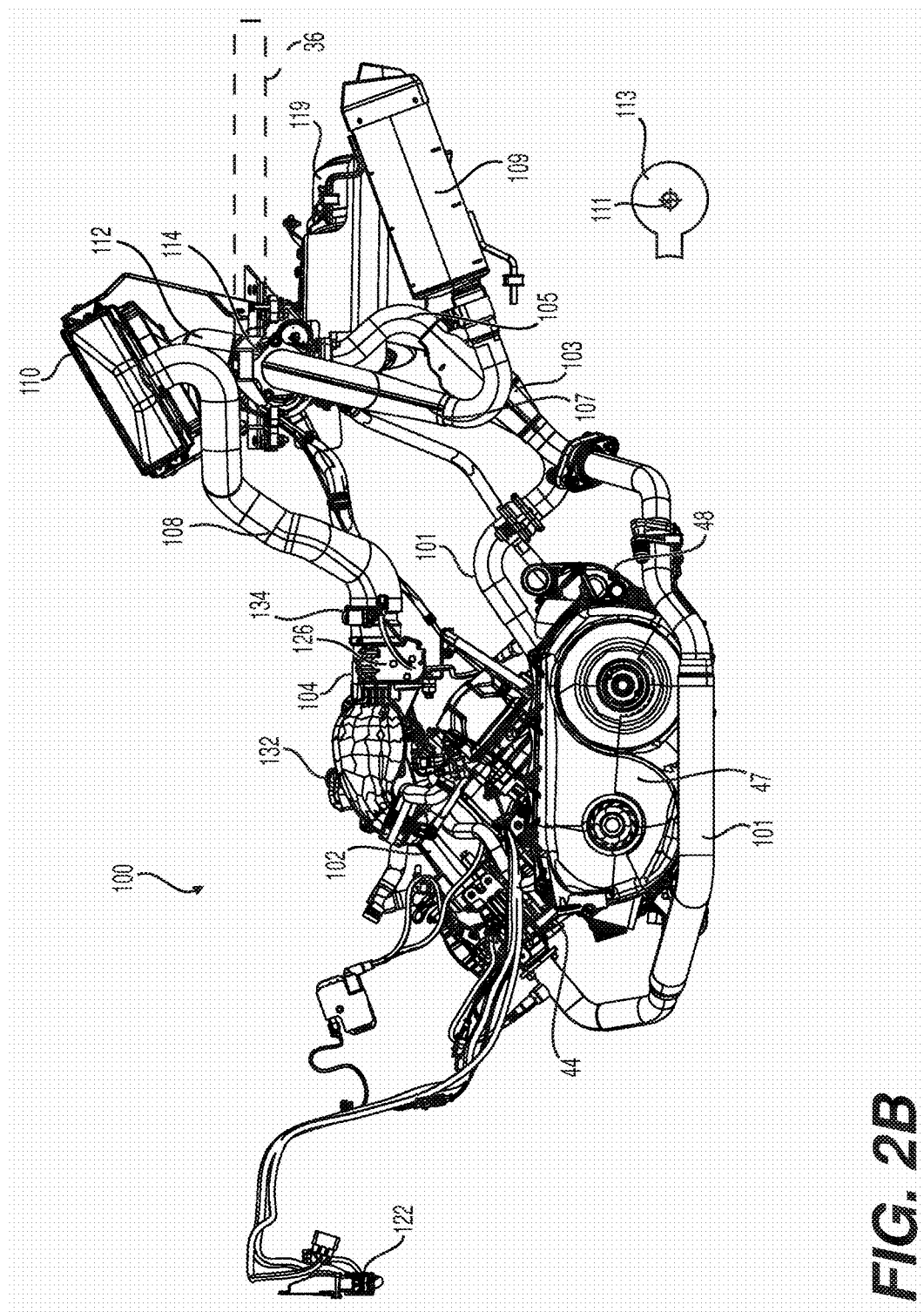
FIG. 2B is a left side elevation view of the power pack of FIG. 2A.

An engine 44 (shown in FIGS. 2A, 2B) is mounted to the middle portion 18B of frame 18 and has a portion disposed between the right and the left seats 28. The engine 44 is operatively connected to the four wheels 20 to power the RUV 10. It is contemplated that the engine 44 could be operatively connected only to the front wheels 20 or only to the rear wheels 20 or could selectively switch between driving two and four wheels 20. A console 46 positioned between the right and left seats 28 covers and separates the engine 44 from the driver and the passenger. The console 46 defines in part a central cooling tunnel allowing air to flow from the front end 12 of the vehicle 10 to the rear end 14 of the vehicle to cool the engine 44. The engine 44 is an internal combustion, four-stroke, V-twin engine. Accordingly, the engine 44 has two cylinders extending at an angle from each other (see FIG. 2B). It is contemplated that other types of engines could be used. For example, the engine 44 could be a two-stroke engine with in-line cylinders. The engine 44 transmits torque to the wheels 20 via a continuously variable transmission (CVT) 47 and a gear-type transmission 48 (FIGS. 2A, 2B). A shifter (not shown) located near the steering device 38 enables a driver to select one of a plurality of drive modes provided by the transmission 48. The drive modes include park, neutral, reverse, low, and drive. It is contemplated that the transmission 48 could have other drive modes.

Fuel to be supplied to the engine 44 is stored in a fuel tank (not shown) disposed under the passenger seat 28. The fuel tank is mounted to the middle portion 18B of the frame 18.

Air is supplied to the engine 44 via an air induction system described in greater detail below.

Figure 3:
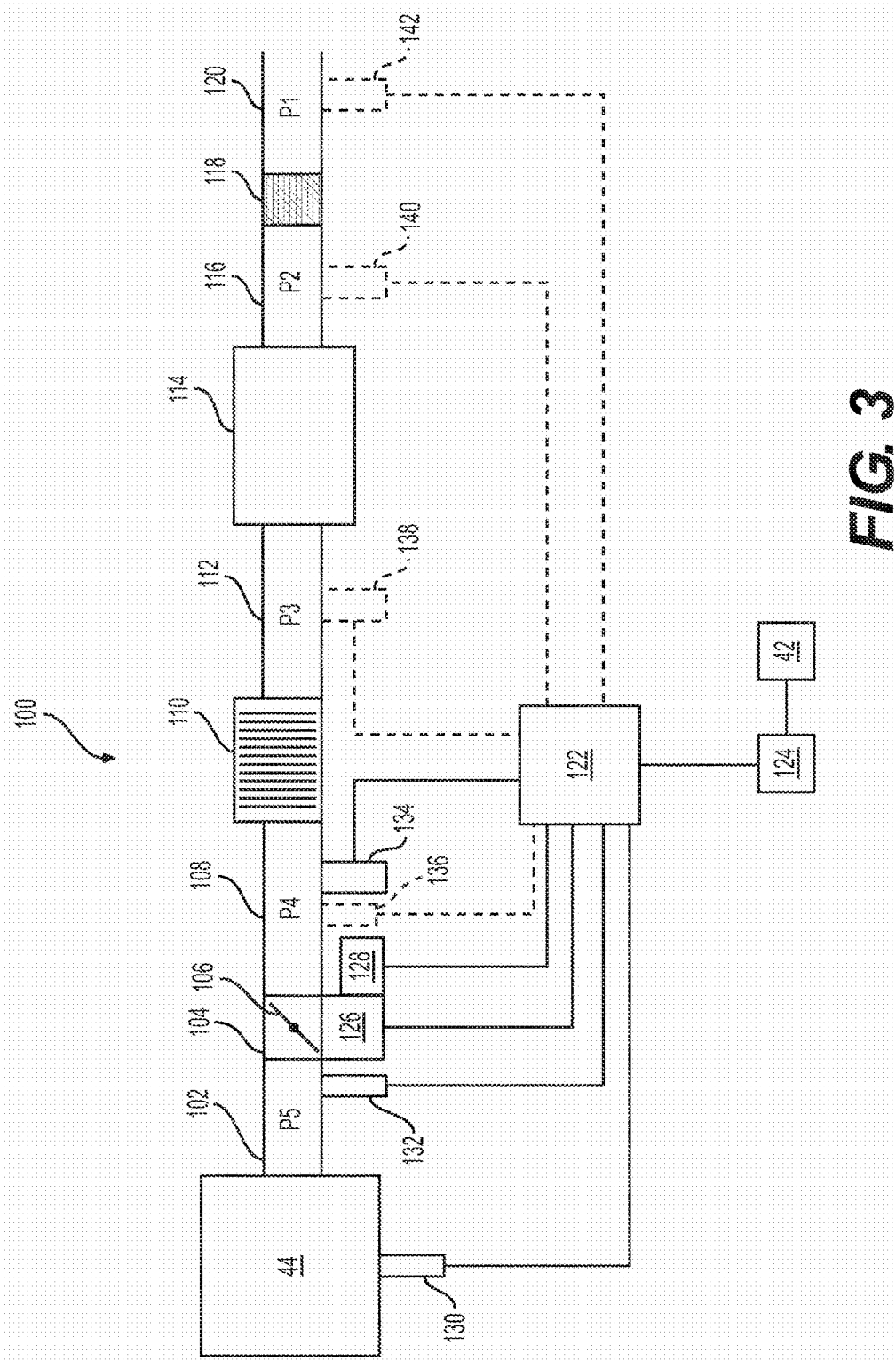
FIG. 3 is a schematic representation of the power pack of FIG. 2A.

Turning now to FIGS. 2A to 3, a power pack 100 of the RUV 10 will be described. The power pack 100 includes the engine 44, the air induction system, the exhaust system, fuel and ignition systems (not shown) and components for controlling the operation of the power pack. In FIG. 3, various components are illustrated as being disposed in line. However, it should be understood that FIG. 3 is only a schematic representation illustrated as shown for ease of understanding, and that the connections between these components would be routed therebetween as required as would be understood from looking at FIGS. 2A and 2B.

The engine 44 has intake and exhaust ports (not shown). An air intake manifold 102 is connected to the intake ports of the engine 44 to deliver air to the combustion chambers (not shown) of the engine 44. A throttle body 104 is fluidly connected to the intake manifold 102 and is disposed upstream thereof. As can be seen in FIGS. 2A and 2B, the throttle body 104 is disposed above a rear portion of the engine 44 and between the seats 28. The throttle body 104 has a throttle valve 106 pivotally supported therein.

During operation of the engine 44, the throttle valve 106 is movable between a wide open throttle valve position and an idle (or minimum) position. In the wide open throttle valve position, a maximum amount of air for the current operating conditions is supplied to the engine 44. The wide open throttle valve position corresponds to 100 percent throttle in the graphs of FIGS. 6, 8 and 9. In the idle position, the throttle valve 106 is slightly opened and a minimum amount of air for the current operating conditions is supplied to the engine 44. The idle position corresponds to about 10 percent throttle in the graphs of FIGS. 6, 8 and 9. It is contemplated that the idle position could differ depending on the engine and the desired operating characteristics of the engine at idle. It is contemplated that the throttle valve 104 could be moved to a position that is less than the idle position when the engine 44 is not in operation.

An air conduit 108 is fluidly connected to the throttle body 104 and is disposed upstream thereof. An air cooler 110 is fluidly connected to the air conduit 108 and is disposed upstream thereof. In the present implementation, the air cooler 110 is an intercooler, but it is contemplated that other types of air coolers could be used and/or that more than one air cooler 110 could be used. As can be seen in FIGS. 2A and 2B, the air cooler 110 is laterally centered on the RUV 10, is disposed above the cargo rack 36 (shown in dotted lines in FIG. 2B) behind the seats 28. As seen in FIG. 2B, the air cooler 110 is also disposed forward of a laterally extending axis or rotation 111 of a rear differential 113 used to transmit torque from the engine 44 to the rear wheels 20. An air conduit 112 is fluidly connected to the air cooler 110 and is disposed upstream thereof. The air cooler 110 receives air from the air conduit 112, cools it, and supplies to cooled air to the air conduit 108. It is contemplated that the air cooler 110 could be omitted.

An air compressor 114 is fluidly connected to the air conduit 112 and is disposed upstream thereof. As can be seen in FIG. 2B, the air compressor 114 is disposed under the air cooler 110 and cargo rack 36, behind the seats 28 and higher than and forward of the axis 111. An air conduit 116 is fluidly connected to the air compressor 114 and is disposed upstream thereof. The air compressor 114 receives air from the air conduit 116, compresses the air, and the supplies the compressed air to the air conduit 112. In the present implementation, the air compressor 114 is a turbocharger, in which the exhaust gases from the engine 44 are used to turn a turbine of the turbocharger.

An air filter 118 (FIG. 3) is fluidly connected to the air conduit 116 and is disposed upstream thereof. The air filter 118 is disposed inside an air box 119. As can be seen in FIGS. 2A and 2B, the air box 119 is disposed to the right and partially rearward of the air cooler 110 and partially forward of the axis 111. The air box 119 is disposed below the cargo rack 36. An air conduit 120 is fluidly connected to the throttle body 104 and is disposed upstream thereof. The air conduit 120 is open to the atmosphere on a right side of the RUV 10, rearward of the passenger seat 28, as can be seen in FIG. 2A, and forward of the axis 111.

During operation of the engine 44, air enters the air conduit 120, and then passes through the air filter 118 in the air box 119 to remove dust and other particles from the air. From the filter 118, the filtered air flows through the conduit 116 and enters the air compressor 114. The air compressor 114 compresses the air and supplies the compressed air to the air conduit 112. As a result of its compression by the air compressor 114, the air has increased in temperature which can negatively affect the efficiency of the engine 44. As such, from the conduit 112, the air flows through the air cooler 110 which cools the air and then supplies the cooled air to the air conduit 108. From the air conduit 108, the air flows through the throttle body 104, then the intake manifold 102 and finally enters the air intake ports of the engine 44. As the engine 44 is supplied with compressed air, the engine 44 is referred to as a forced induction engine 44.

Exhaust conduits 101 are connected to the exhaust ports and extend rearward of the engine 44. An exhaust manifold 103 is connected to the exhaust conduits 101 downstream thereof. An exhaust conduit 105 connects the exhaust manifold 103 to the air compressor 114 (i.e. turbocharger) to supply exhaust gases to the air compressor 114. Another exhaust manifold 107 extends from the air compressor 114 to supply the exhaust gases to two mufflers 109. The mufflers 109 are disposed rearward of the seats 28, below the cargo rack 36 on either side of a longitudinal centerline of the RUV 10.

In order to control the operation of the engine 44, a control unit 122 is provided. The control unit 122 receives signals from various sensors (some of which are described below), and sends signals to various components to control the operation of these components based on the signals received from the sensors. Although only one control unit 122 is shown, it is contemplated that the control unit 122 could be replaced by multiple control units sharing the various functions of the control unit 122. Also, in the described implementation, the various components connected to the control unit 122 are electrically connected to the control unit 122 by wires. However, it is contemplated that one or more of the various components could be wirelessly connected to the control unit 122 to permit the exchange of signals therebetween.

A throttle operator position sensor 124 senses a position of the throttle pedal 42. The throttle operator position sensor 124 is electrically connected to the control unit 122 and sends a signal representative of the position of the throttle pedal 42 to the control unit 122. The throttle pedal 42 is movable between a 0 percent throttle operator position, which is the position of the throttle pedal 42 when the driver completely releases the pedal 42, and a 100 percent throttle operator position, which is the position of the pedal 42 when the driver fully depresses the pedal 42. The pedal 42 is biased toward the 0 percent throttle operator position. In vehicles using a throttle operator other than a throttle pedal 42, such as a twist grip or a throttle lever for example, the throttle operator position sensor 124 is adapted to sense the position of the particular type of throttle operator. It is contemplated that the throttle operator position sensor 124 could sense the position of an element of the RUV 10 other than the throttle pedal 42 that is moved by the throttle pedal 42, in which case the control unit 122 could determine the throttle operator position by using the positional relationship between the throttle pedal 42 and the element.

A throttle valve actuator 126 is disposed on a left side of the throttle body 104. The throttle valve actuator 126 is connected to the throttle valve 106 to pivot the throttle valve 106 between its various positions. The throttle valve actuator 126 is electrically connected to the control unit 122 and receives signals from the control unit 122. The throttle valve actuator 126 moves the throttle valve 106 based on the signals received from the control unit 122. In the present implementation, the throttle valve actuator 126 is a rotary electrical motor, but other types of throttle valve actuators are contemplated. Systems of this type are sometimes referred to as throttle-by-wire systems.

A throttle valve position sensor 128 senses a position of the throttle valve 106 by sensing a position of a shaft of the throttle valve actuator 126. It is contemplated that the throttle valve position sensor 128 could sense the position of the throttle valve 106 directly. It is also contemplated that the throttle valve position sensor 128 could be integrated into the throttle valve actuator 126. The throttle valve position sensor 128 is electrically connected to the control unit 122 and sends a signal representative of the position of the throttle valve 106 to the control unit 122.

An engine speed sensor 130 senses a speed of rotation of a crankshaft (not shown) of the engine 44. The engine speed sensor 130 is electrically connected to the control unit 122 and sends a signal representative of the engine speed to the control unit 122. It is contemplated that the engine speed sensor 130 could sense the speed of rotation of an element of the RUV 10 other than the crankshaft that is driven by the engine 44, in which case the control unit 122 could determine the engine speed by using the transmission ratio between the crankshaft and the element.

An air pressure sensor 132 senses an air pressure P5 in the air intake manifold 102. The air pressure sensor 132 is electrically connected to the control unit 122 and sends a signal representative of the air pressure P5 to the control unit 122.

An air pressure sensor 134 senses an air pressure P4 in the air conduit 108. The air pressure sensor 134 is electrically connected to the control unit 122 and sends a signal representative of the air pressure P4 to the control unit 122.

It is contemplated that in alternative implementations of the power pack 100, other sensors could be used in addition to or instead of the sensors described above. Some examples of such sensors are illustrated in dotted lines in FIG. 3 and will be described below.

An air flow rate sensor 136 senses an air flow rate in the air conduit 108. It is contemplated that the air flow rate sensor 136 could sense the air flow rate by mass or by volume of air. The air flow rate sensor 136 is electrically connected to the control unit 122 and sends a signal representative of the air flow rate to the control unit 122. It is contemplated that the air flow rate sensor 136 could be disposed elsewhere so as to sense the air flow rate in other portions of the air induction system. It is also contemplated that more than one air flow rate sensor 136 could be provided.

An air pressure sensor 138 senses an air pressure P3 in the air conduit 112. The air pressure sensor 138 is electrically connected to the control unit 122 and sends a signal representative of the air pressure P3 to the control unit 122.

An air pressure sensor 140 senses an air pressure P2 in the air conduit 116. The air pressure sensor 140 is electrically connected to the control unit 122 and sends a signal representative of the air pressure P2 to the control unit 122.

An air pressure sensor 142 senses an air pressure P1 in the air conduit 120. The air pressure sensor 142 is electrically connected to the control unit 122 and sends a signal representative of the air pressure P1 to the control unit 122.

It is also contemplated that another air pressure sensor could be provided outside of the air induction system to sense the atmospheric pressure. The atmospheric air pressure sensor would be electrically connected to the control unit 122 and would send a signal representative of the atmospheric air pressure to the control unit 122.

Figure 4A:
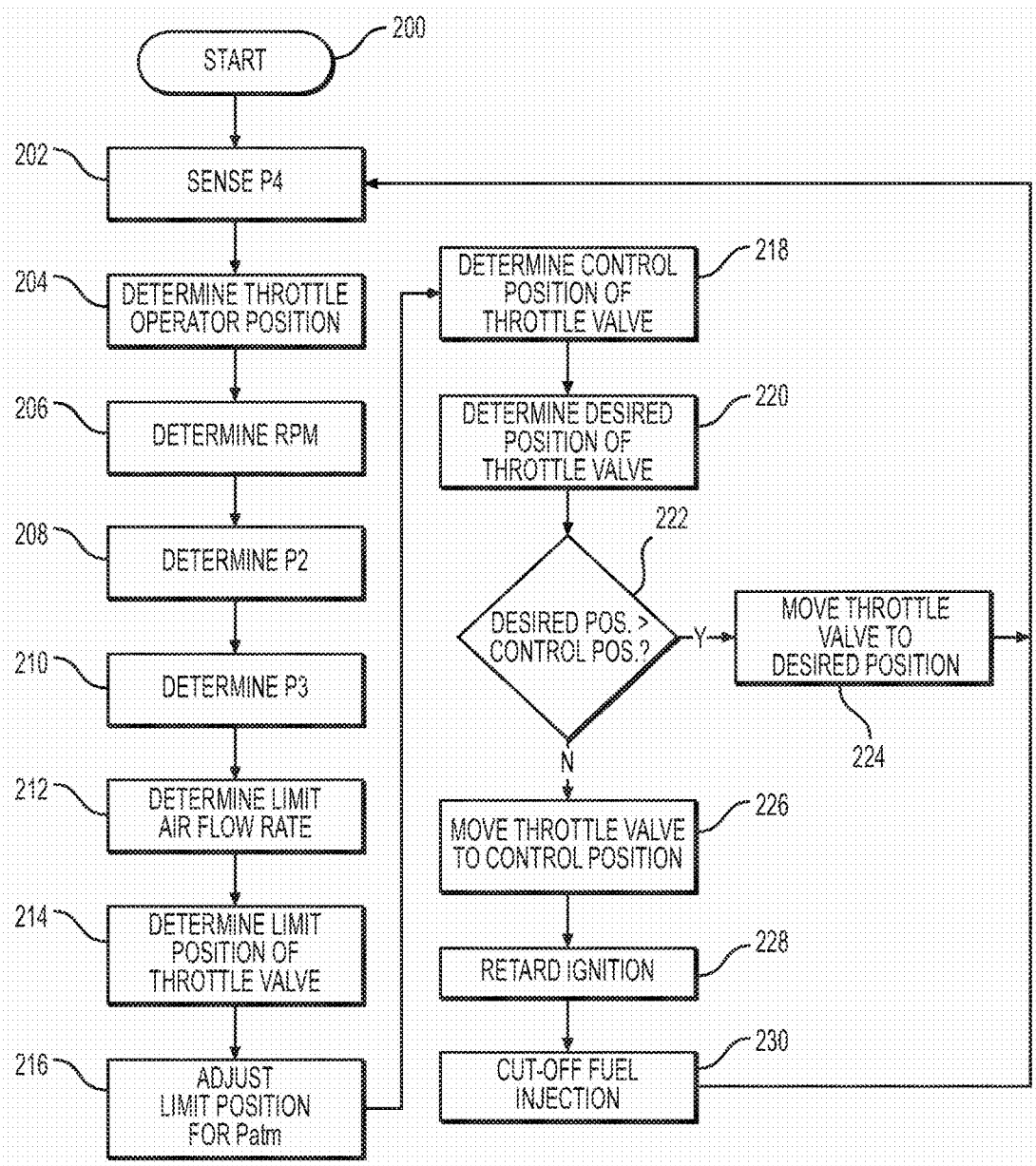
FIG. 4A illustrates an implementation of a method of controlling an the engine of the RUV of FIG. 1.

Turning now to FIGS. 4A, 5 to 7 and 9, a method of controlling the engine 44 will be described. With reference to FIG. 4A, the method is initiated at step 200 when the driver inserts the key of the RUV 10 in the ignition. Then at step 202, the air pressure sensor 134 senses the air pressure P4 and sends a corresponding signal to the ECU 122. Then at step 204, the control unit 122 determines the position of the throttle pedal 42 based on the signal received from the throttle operator position sensor 124. Then at step 206, the control unit 122 determines the engine speed based on the signal received from the engine speed sensor 130.

From step 206, the control unit proceeds to step 208. At step 208, the control unit 122 determines the air pressure P2 upstream of the air compressor 114 based on the signal received from the pressure sensor 134 under certain conditions described below. In order to determine the pressure P2, the control unit 122 first determines the pressure P1 based on the signal received from the pressure sensor 134 under these certain conditions. When the engine 44 is stopped or operating below or at a low engine speed for a predetermined period of time, the control unit 122 determines that the pressure P4 sensed by the pressure sensor 134 corresponds to the pressure P1. As would be understood, when the engine 44 is operating at low engine speed, the air pressure P4 is not identical to the air pressure P1, but the difference is sufficiently small that it can be ignored. It is contemplated that the control unit 122 could use an algorithm to determine the pressure P1 based on the sensed pressure P4 at or below the low engine speed. In one implementation, the low engine speed is the idle speed of the engine 44. The determined value of the air pressure P1 when the engine 44 is stopped or operating below or at the low engine speed is stored by the control unit 122. This value of P1 is then used as the value for the air pressure P1 until the engine 44 is stopped again or operates below or at the low engine speed, in which case the value of the air pressure P1 is once again determined from the sensed air pressure P4 as described above and this updated value of air pressure P1 is then stored and used by the control unit. Once the value of the air pressure P1 has been determined, the control unit 122 determines the air pressure P2 by subtracting a predetermined pressure value from the air pressure P1. The predetermined value that is subtracted from the air pressure P1 to determine the air pressure P2 corresponds to the amount of air pressure drop that the air experiences as it flows through the air filter 118. The amount of air pressure drop across the air filter 118 is available from the technical specifications of the air filter 118 or can be determined experimentally as would be known by a person skilled in the art by using known or sensed parameters such as engine speed, the position of the throttle pedal 42 and/or the position of the throttle valve 106. In an alternative implementation, the power pack 100 is provided with the air pressure sensor 142 that senses the air pressure P1, in which case the control unit 122 can determine the air pressure P2 by subtracting the amount of air pressure drop across the air filter 118 from the air pressure P1 sensed by the air pressure sensor 142. In another alternative implementation, the power pack 100 is provided with the air pressure sensor 140 that senses the air pressure P2, in which case the control unit 122 receives the value of the air pressure P2 directly from the air pressure sensor 140.

From step 208, the control unit proceeds to step 210. At step 210, the control unit 122 determines the air pressure P3 downstream of the air compressor 114 based on the signal received from the pressure sensor 134. The control unit 122 determines the air pressure P3 by adding a predetermined pressure value to the air pressure P4 sensed by the air pressure sensor 134. The predetermined value that is added to the air pressure P4 to determine the air pressure P3 corresponds to the amount of air pressure drop that the air experiences as it flows through the air cooler 110. The amount of air pressure drop across the air cooler 110 is available from the technical specifications of the air cooler 110 or can be determined experimentally as would be known by a person skilled in the art. In another alternative implementation, the power pack 100 is provided with the air pressure sensor 138 that senses the air pressure P3, in which case the control unit 122 receives the value of the air pressure P3 directly from the air pressure sensor 138.

Figure 5:
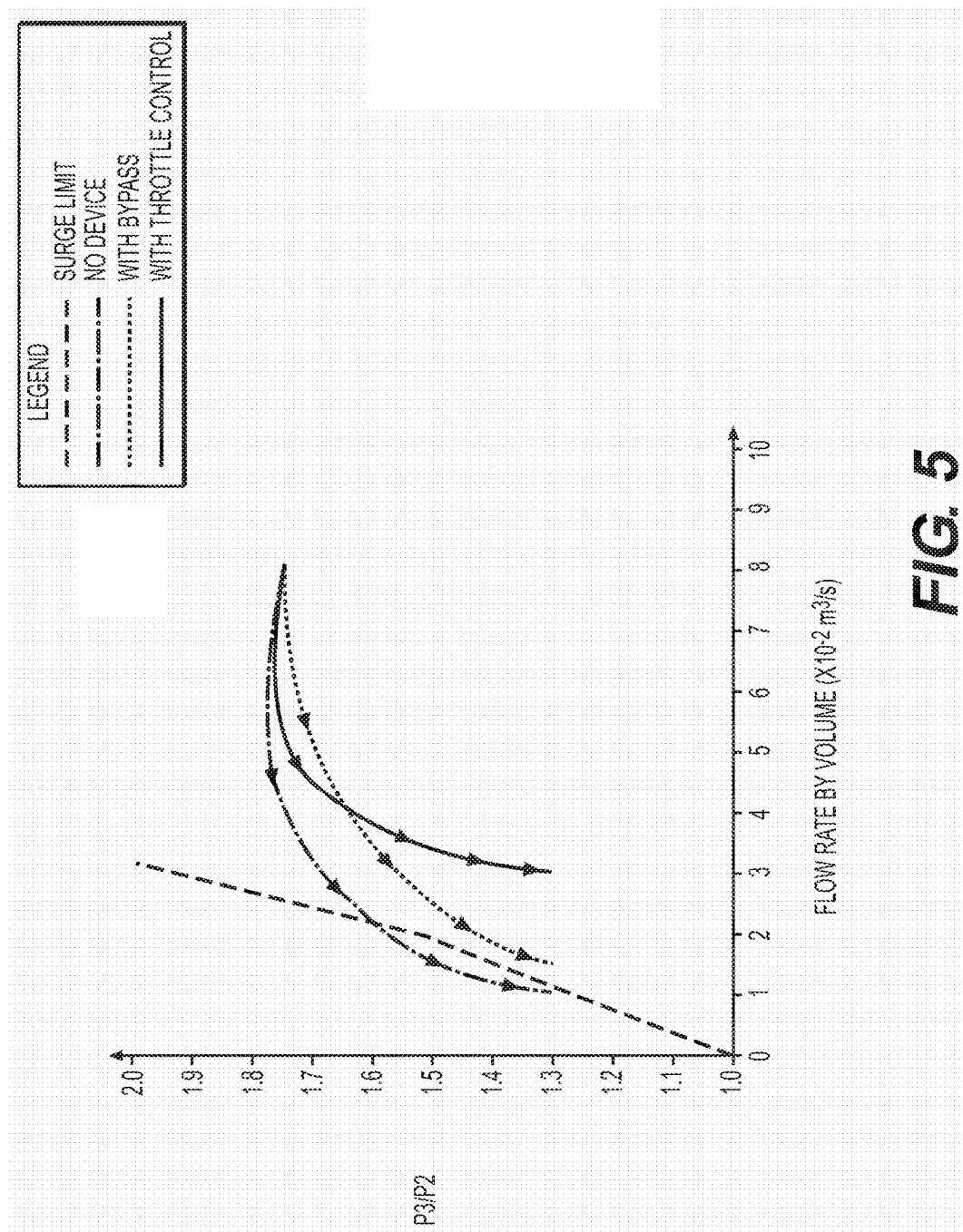
FIG. 5 is a graph of pressure ratio versus air flow rate for a power pack without air pressure surge protection (dash-dot line), with a bypass valve (dotted line), and with the present technology (solid line) and showing a surge limit line (dashed line) for an air compressor of the RUV of FIG. 1.

Once the values of the air pressures P2 and P3 have been determined as described above, the control unit proceeds to step 212. At step 212, the control unit 122 determines a limit air flow rate. The limit air flow rate is the air flow rate corresponding to the surge limit of the air compressor 114 for the air pressures P2 and P3 determined at steps 208 and 210. FIG. 5 illustrates the surge limit line (i.e. the dashed line) for the air compressor 114 in terms of the ratio of the air pressure P3 over the air pressure P2 and the air flow rate. The control unit 122 determines the ratio of P3 over P2 from the values determined at steps 210 and 208. Then using this ratio and the graph of FIG. 5, one can determine the value of the air flow rate corresponding to this ratio on the surge limit line. This value of the air flow rate is the limit air flow rate. For example, for a pressure ratio of 1.6, the limit air flow rate is 2.1 m$^3$ per second. It should be understood that for the control unit 122 to determine the value of the limit air flow rate, the graph of FIG. 5 is expressed in terms of an algorithm or a numerical map or matrix. If the air flow to the engine 44 falls below the air flow limit, the air compressor 114 may become damaged due to the pressure surge and a noise may be generated due to the pressure surge. It should be understood that the air flow to the engine 44 falling below the air flow limit may not necessarily result in damage to the air compressor 114 as a safety factor has likely been incorporated into the technical specification of air compressor 114. It is contemplated that the surge limit line for the air compressor 114 could be obtained from experimentation.

Figure 6:
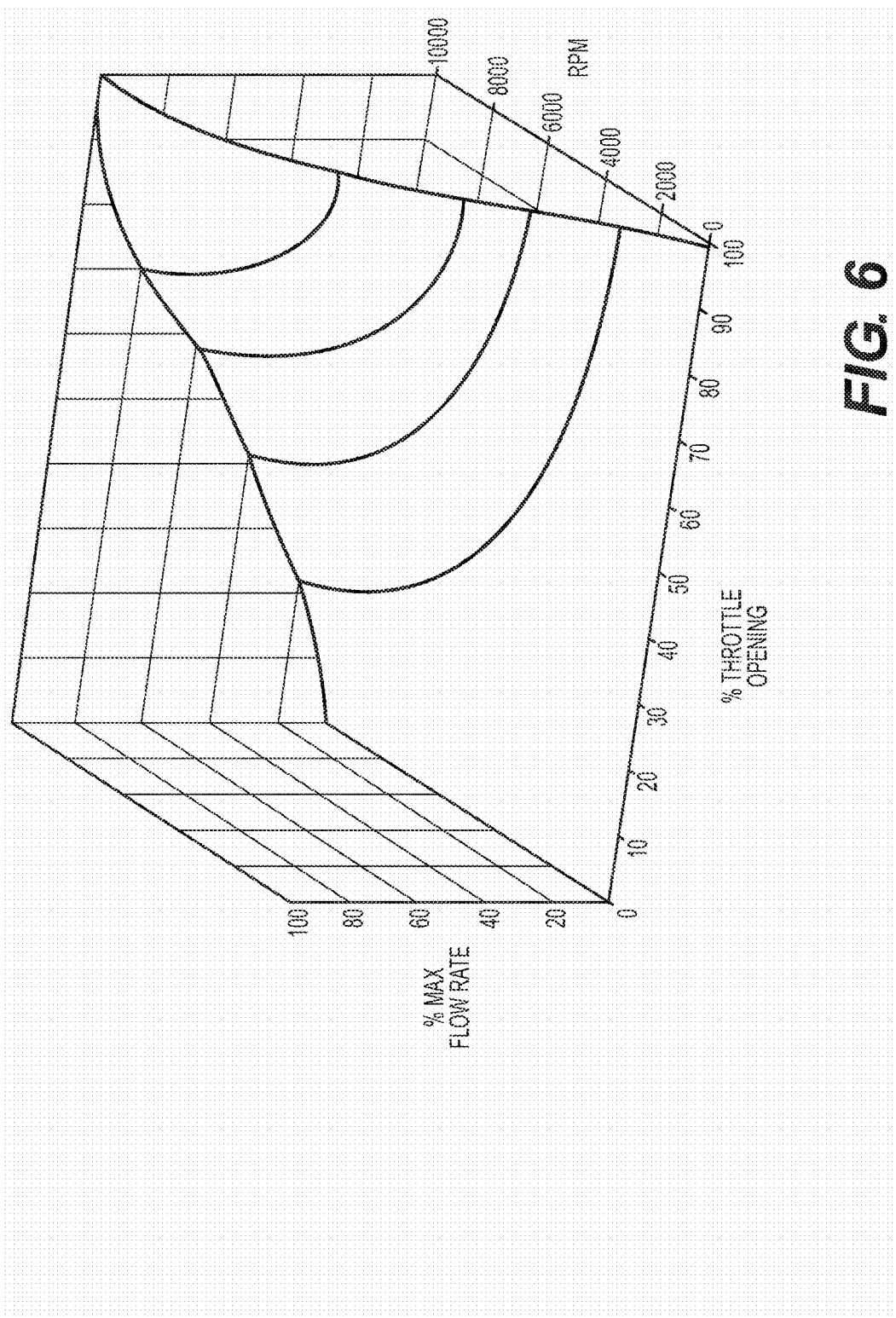
FIG. 6 is a graph of flow rate versus throttle valve position and engine speed for the power pack of FIG. 3.

Once the limit air flow rate has been determined by the control unit 122 at step 212, at step 214 the control unit 122 determines the limit position of the throttle valve 106 that will provide this limit air flow rate. Therefore, the limit position of the throttle valve 106 is the lowest position that the throttle valve 106 can have for the current operating positions (i.e. engine speed, pressures P3 and P2) without potentially risking damages to the air compressor 114 due to pressure surge and without generating noise due to pressure surge. FIG. 6 illustrates an examplary graph of the percentage of the maximum air flow rate possibly obtained for various engine speeds and percentage of throttle opening. The maximum air flow rate (i.e. 100 percent of the maximum air flow rate) is the flow rate of air to the engine 44 that occurs when the engine 44 is operating at its maximum engine speed with the throttle valve 106 wide open. 100 percent of throttle opening corresponds to the position of the throttle valve 106 when it is in a wide open position. 0 percent of throttle opening corresponds to the position of the throttle valve 106 which provides the smallest possible passage for air, which in some cases means that the throttle valve 106 fully closes the throttle body 104 except for apertures in the valve 106 or bypass passages. The control unit 122 converts the limit air flow rate obtained at step 212 to a percentage of the maximum air flow rate. Using this percentage and the engine speed obtained at step 206 together with the graph of FIG. 6, the corresponding percentage of throttle opening can be obtained. The position of the throttle valve 106 corresponding to this percentage of throttle opening is the limit position of the throttle valve 106. It should be understood that for the control unit 122 to determine the value of the limit position of the throttle valve 106, the graph of FIG. 6 is expressed in terms of an algorithm or a numerical map or matrix. In the event that the limit flow rate determined at step 212 is less than or equal to the idle air flow (i.e. the air flow that should be present to make the engine operate at idle speed) due to a low pressure ratio (P3 over P2), the limit position of the throttle valve 106 is the idle position of the throttle valve 106.

In the present implementation, the data for the graph of FIG. 6 is accurate when the atmospheric pressure in which the RUV 10 operates is 1 atmosphere (i.e. 101.3 kPa). As such, at step 216 the control unit 122 adjusts the limit position of the throttle valve 106 using an algorithm in order to compensate for variations in atmospheric pressure. In the present implementation, the control unit 122 uses the value of air pressure P1 stored at step 208 described above as the atmospheric pressure. Alternatively, the control unit 122 could determine the air pressure P1 from the air pressure sensor 142 should this sensor be provided or could obtain the air pressure directly from an air pressure sensor disposed outside the air induction system which senses atmospheric pressure. It is contemplated that instead of using an algorithm to adjust the limit position of the throttle valve 106 to compensate for variations in atmospheric pressure, the control unit 122 could use multiple maps such as the one shown in FIG. 6, each of which would be established for different atmospheric pressures. It is also contemplated that step 216 could be omitted.

Then at step 218, the control unit 122 determines what is referred to herein as a control position of the throttle valve 106. The control position of the throttle valve 106 is a position of the throttle valve 106 that is slightly greater than the limit position of the throttle valve 106 so as to provide an additional safety factor. The control unit 122 determines the control position of the throttle valve 106 by adding a predetermined number of degrees of throttle opening, three percent for example, to the limit position of the throttle valve 106. Alternatively, the control unit 122 could determine the control position of the throttle valve 106 using an algorithm. For example, as a result of such an algorithm, the number of degrees of throttle opening added to the limit position of the throttle valve 106 could be greater for higher engine speeds or pressure ratios (P3 over P2). In an alternative implementation, step 218 is omitted and the safety factor is integrated into the determination of the limit air flow rate. In such an implementation, the control position of the throttle valve 106 would correspond to the position of the throttle valve 106 determined at step 216.

Then at step 220, the control unit 122 determines the desired position of the throttle valve 106. The desired position of the throttle valve 106 is the position at which the throttle valve 106 should be positioned based on the current operating conditions of the engine 44 and driver input. As such, the control unit 122 uses the position of the throttle pedal 204 determined at step 204 and the engine speed determined at step 206 to determine the position at which the throttle valve 106 should be positioned to correspond to the driver's demand (i.e. the desired position). It is contemplated that the control unit 122 could use additional data to calculate the desired position of the throttle valve 106, such as, but not limited to, the speed of the RUV, the air pressure P5 and the drive mode of the transmission 48.

Then at step 222, the control unit 122 compares the desired position of the throttle valve 106 determined at step 220 to the control position of the throttle valve 106 determined at step 218. If the desired position is greater than the control position, this indicates that there is no risk of surge at the air compressor 114 caused by moving the throttle valve 106 to the desired position. Therefore, when the desired position is greater than the control position, at step 224 the control unit 122 sends a signal to the throttle valve actuator 126 to move the throttle valve 106 to the desired position determined at step 220. From step 224, the control unit 122 returns to step 202 and the method is repeated. If the desired position is less than or equal to the control position, this indicates that there is a risk of surge at the air compressor 114 caused by moving the throttle valve 106 to the desired position. Therefore, when the desired position is less than or equal to the control position, at step 226 the control unit 122 sends a signal to the throttle valve actuator 126 to move the throttle valve 106 to the control position determined at step 218 so as to prevent surge at the air compressor 114.

Typically, although other conditions may exist, the control unit 122 will go from step 222 to step 226 and cause the throttle valve 104 to move to the control position when the driver of the RUV 10 suddenly releases the throttle pedal 42. This sudden release of the throttle pedal 42 indicates that the driver desires the engine speed to be reduced quickly. Such a reduction of engine speed would occur if the throttle valve 106 was allowed to be move to the desired position, but that is not the case in the present method where the throttle valve 106 is moved to a control position that is greater than the desired position of the throttle valve 106. Therefore, in order to compensate for the greater opening of the throttle valve 106, the control unit 122 sends control signals to the engine 44 to retard ignition (step 228) and stop (cut-off) fuel injection (step 230) in order to obtain a reduction in engine speed comparable to the reduction in engine speed that would have occurred had the throttle valve 106 been moved to the desired position. It is contemplated that one or both of steps 228, 230 could be omitted. It is contemplated that other methods could be used to reduce the engine speed, such as providing a brake on an output shaft of the engine 44 for example. From step 230, the control unit 122 returns to step 202 and the method is repeated.

Figure 7:
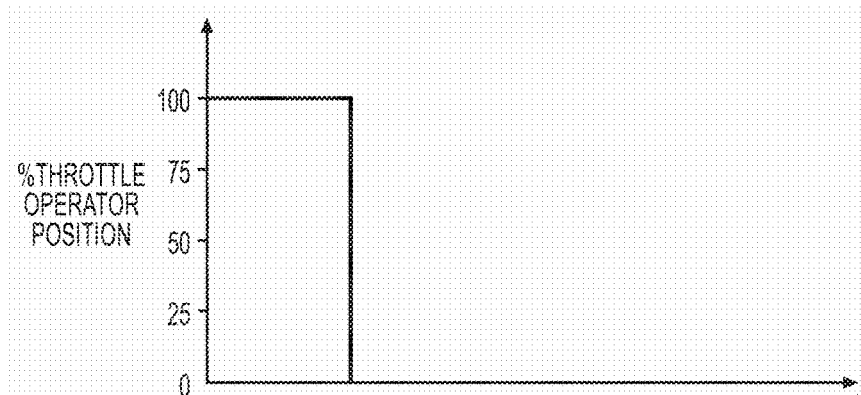
FIG. 7 is a graph of a throttle operator position over time according to one example.
Figure 8:
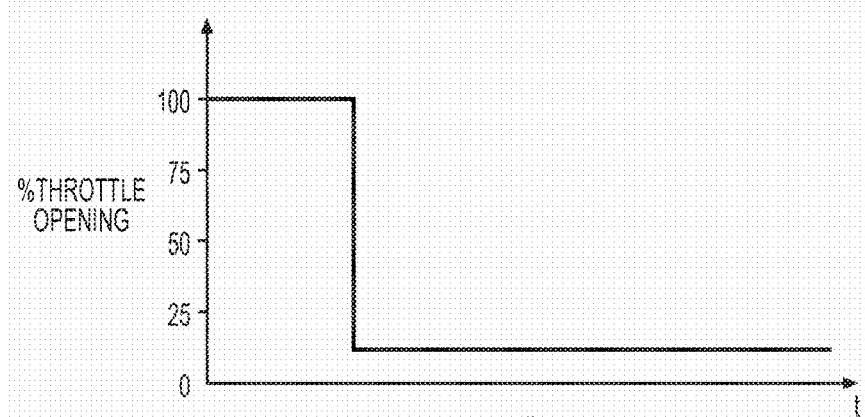
FIG. 8 is a graph of a prior art throttle valve response to the throttle operator position of FIG. 7.
Figure 9:
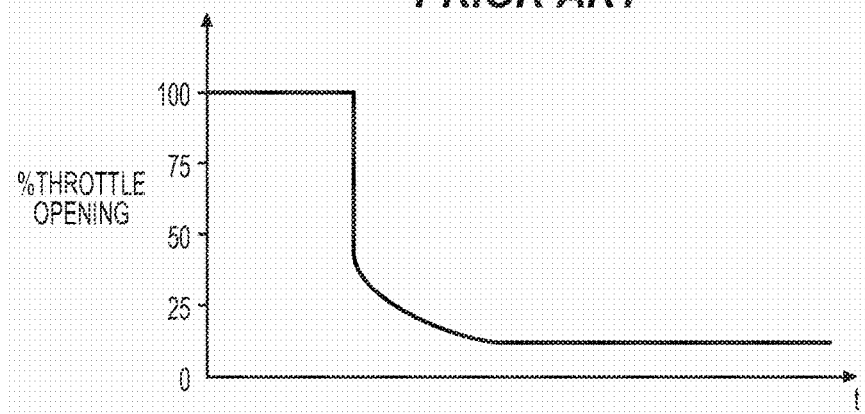
FIG. 9 is a graph of a throttle valve response to the throttle operator position of FIG. 7 according to the method of FIG. 4A.

With reference to FIGS. 5, 7 and 9, the result of an exemplary implementation of the above method will be described. In the present example, the driver initially has the throttle pedal 42 fully pressed down (i.e. 100 percent throttle operator position) as shown in FIG. 7, which results in the throttle valve 106 to be wide open (i.e. 100 percent throttle position), as shown in FIG. 9, and, as can be seen with reference to the solid line in FIG. 5, a high pressure ratio (P3 over P2 of 1.75) and a high air flow rate (0.08 m$^3$ per second). As can be seen in FIG. 7, the throttle pedal 42 is then suddenly released (i.e. the percentage of throttle operator position drops to zero). In the prior art, the throttle valve 106 is controlled to move to the desired position, which as can be seen in FIG. 8, causes the throttle valve 106 to move suddenly to its idle position (about 10 percent throttle opening). As can be seen by looking at the dash-dot line in FIG. 5, the resulting reduction in air flow rate and pressure ratio is insufficient to avoid possible surge at the air compressor 114 (i.e. the dash-dot line crosses the pressure surge limit line (dashed line)), unless the power pack is provided with appropriately selected bypass valve(s) (dotted line). By applying the method described above with respect to FIG. 4A, following the release of the throttle pedal 42, as shown in FIG. 9, the throttle valve 106 is initially moved to the desired position of the throttle valve 106 (i.e. the vertical portion in FIG. 9), but when the throttle valve reaches about 35 percent of throttle opening the desired position of the throttle valve 106 becomes greater than the control position of the throttle valve 106. As a result, the throttle valve 106 is then moved to the control position of the throttle valve 106, which causes the throttle valve 106 to move gradually toward the idle position. As a result, as can be seen by looking at the solid line in FIG. 5, the air flow rate and pressure ratio are reduced so as to avoid damage to the air compressor 114 and noise due to pressure surge without the need of a bypass valve.

The example illustrated in FIGS. 5, 7 and 9 is only one example of conditions that, but for the present method, would potentially lead to damage to the air compressor 114 and noise due to pressure surge. It is contemplated that releasing the throttle pedal 42 from a throttle position that is less than 100 percent may also lead to conditions that, but for the present method, would potentially lead to damage to the air compressor 114 and noise due to pressure surge. It is also contemplated that releasing the throttle pedal 42 to a throttle position that is greater than 0 percent (i.e. not fully released) may also lead to conditions that, but for the present method, would potentially lead to damage to the air compressor 114 and noise due to pressure surge.

In an alternative implementation of the method illustrated in FIG. 4A, steps 214 to 218 are omitted and the power pack 100 is provided with the air flow sensor 136. In this alternative implementation, steps 200 to 212 are performed as described above with respect to FIG. 4A. From step 212, the control unit 122 goes to step 220 and determines the desired position of the throttle valve 106 as described above. Then from step 220, the control unit 122 sends a signal to the throttle valve actuator 126 to start moving the throttle valve 106 toward the desired position of the throttle valve 106. As the throttle valve 106 is moved toward the desired position, the control unit 122 compares the air flow rate readings obtained from the air flow rate sensor 136 to the limit air flow rate determined at step 212. The control unit 122 continues to let the throttle valve 106 move toward the desired position unless the air flow rate measured by the air flow rate sensor 136 is the limit air flow rate, at which point the control unit 122 sends a signal to the throttle valve operator 126 to stop moving the throttle valve 106. It is contemplated that the control unit 122 could send a signal to the throttle valve operator 126 to stop moving the throttle valve 106 when the air flow rate sensor 136 measures an air flow rate that is slightly higher than the limit air flow rate in order to provide an additional safety factor. In the event that the throttle valve 104 is stopped from moving toward the desired position because the air flow rate measured by the air flow rate sensor 136 is the limit air flow rate (or slightly higher), the control unit then sends signals to the engine 44 to retard ignition and stop fuel injection as in steps 228 and 230 above.

Figure 10:
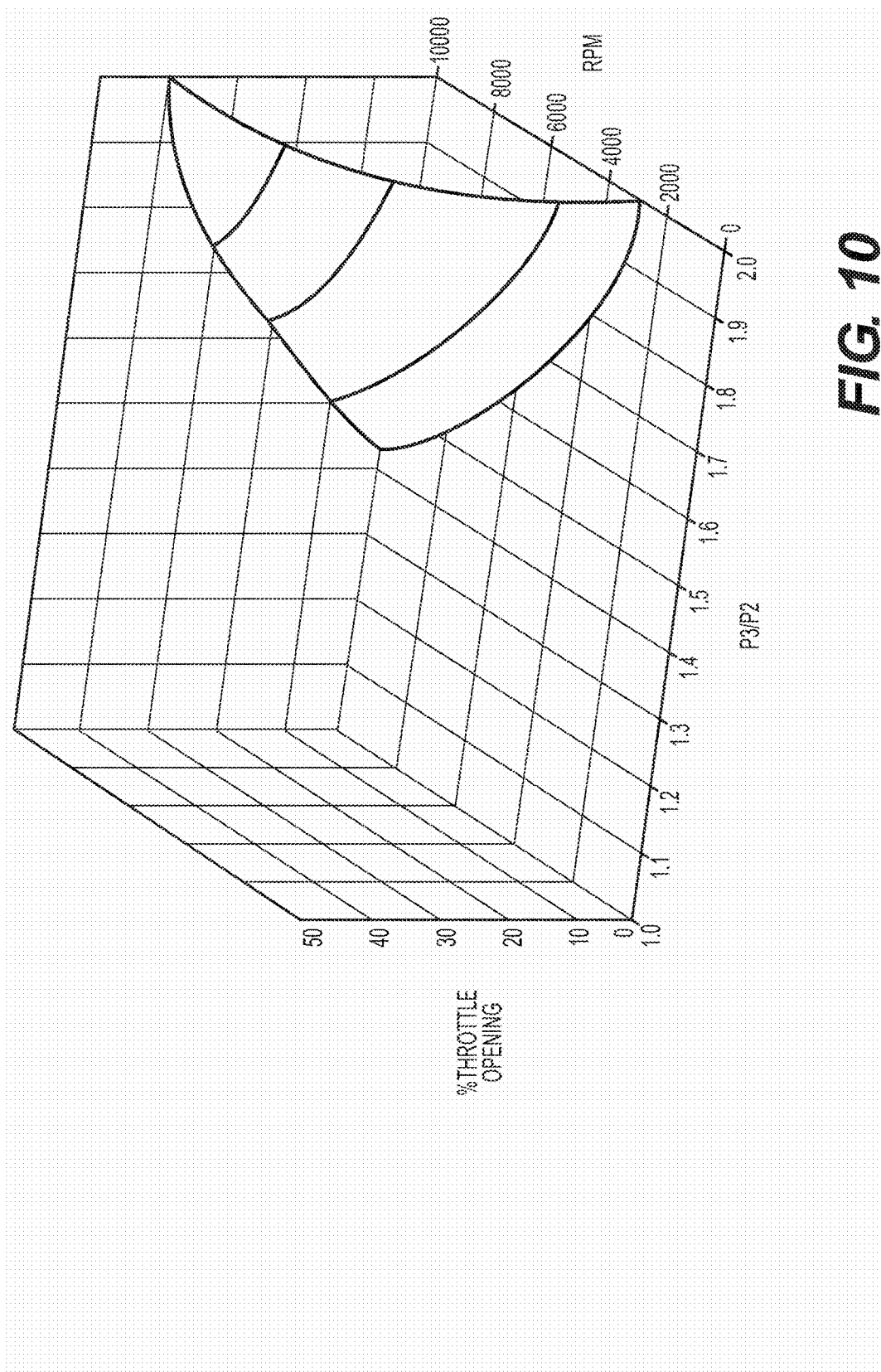
FIG. 10 is a graph of throttle valve position versus pressure ratio and engine speed for the power pack of FIG. 3.

In another alternative implementation of the method illustrated in FIG. 4A, step 212 is omitted. In this alternative implementation, steps 200 to 210 are performed as described above with respect to FIG. 4A. From step 210, the method proceeds to step 214 to determine the limit position of the throttle valve 106. However, in this implementation the limit position of the throttle valve 106 is determined differently than in the method of FIG. 4A. In the present implementation, the control unit 122 determines the limit position of the throttle valve 106 by using a control map like the one shown in FIG. 10 which graphs the limit position of the throttle valve (i.e. the vertical axis) for the various engine speeds and pressure ratios. By using the engine speed determined at step 206 and the air pressures P2, P3 determined at steps 208, 210 to determine the pressure ratio (i.e. P3 over P2) the limit position of the throttle valve 106 can be obtained directly from the control map, which in FIG. 10 is expressed as a percentage of throttle opening. From this modified version of step 214, the control unit 122 proceeds to step 216 and the following steps are performed as described above with respect to the method illustrated in FIG. 4A.

Figure 4B:
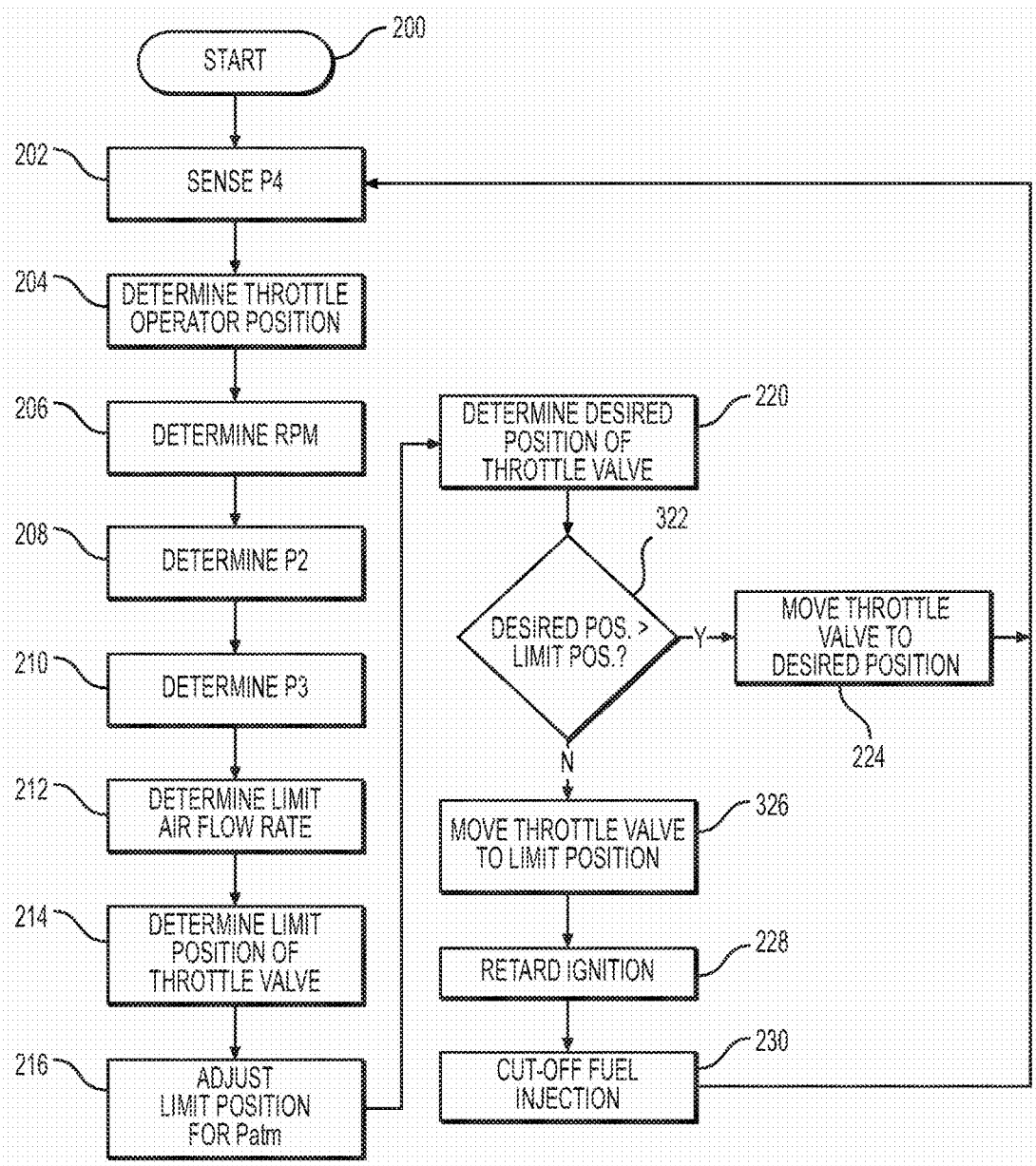
FIG. 4B illustrates an alternative implementation of a method of controlling the engine of the RUV of FIG. 1.

FIG. 4B illustrates another alternative implementation of the method illustrated in FIG. 4A. In this implementation, step 218 has been omitted and steps 222 and 226 of the method illustrated in FIG. 4A have been replaced with steps 322 and 326 respectively. In the method illustrated in FIG. 4B, steps 200 to 216 are performed as described above with respect to FIG. 4A. From step 216, the method proceeds to step 220 which is performed as described above. From step 220, the control unit 122 proceeds to step 322. At step 322, the control unit 122 compares the desired position of the throttle valve 106 determined at step 220 to the limit position of the throttle valve 106 determined at step 214 instead of to a control position of the throttle vale 106 as in step 222 described above. If at step 322, it is determined that the desired position of the throttle valve 106 is greater than the limit position of the throttle valve 106, then the method proceeds to step 224 which is performed as described above and then returns to step 202 to perform the method once again. If at step 322, it is determined that the desired position of the throttle valve 106 is less than or equal to the limit position of the throttle valve 106, then the method proceeds to step 326. At step 326, the control unit 122 sends a signal to the throttle valve actuator 126 to move the throttle valve 106 to the limit position of the throttle valve 106, instead of to a control position as in step 226 described above. From step 326, the method proceeds to steps 228 and 230, which are performed as described above and then returns to step 202 to perform the method once again.

It is contemplated that the order of at least some of the steps of the methods described above could differ from the order in which they have been described. For example, it is contemplated that the order steps 204, 206, 208 and 210 could be interchanged and that the order of the steps 228, 230 could be inverted.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for controlling a forced induction engine comprising:
   determining a first air pressure upstream of an air compressor, the air compressor supplying compressed air to the engine;
   determining a second air pressure downstream of the air compressor;
   determining a limit air flow rate to the engine corresponding to a surge limit of the air compressor based at least in part on the first and second air pressures; and
   controlling a throttle valve actuator to position a throttle valve at a position providing an air flow rate that is greater than or equal to the limit air flow rate.

2. The method of claim 1, further comprising:
   determining an engine speed; and
   determining a limit position of the throttle valve of the engine based at least in part on the engine speed and the limit air flow rate, the limit position of the throttle valve being a position of the throttle valve below which the surge limit of the air compressor is exceeded;
   wherein controlling the throttle valve actuator to position the throttle valve at the position providing an air flow rate that is greater than or equal to the limit air flow rate includes controlling the throttle valve actuator to position the throttle valve at a position being greater than or equal to the limit position.

3. The method of claim 2, wherein the limit position is an idle position when a ratio of the second air pressure over the first air pressure is below a predetermined value.

4. The method of claim 1, wherein determining the first air pressure includes determining a third air pressure upstream of an air filter, the air filter being disposed upstream of the air compressor.

5. The method of claim 1, wherein determining the second air pressure includes sensing a third air pressure downstream of an air cooler, the air cooler being disposed downstream of the air compressor.

6. The method of claim 5, wherein the air cooler is disposed upstream of the throttle valve.

7. The method of claim 2, further comprising determining an atmospheric air pressure; and
   wherein the limit position of the throttle valve of the engine is based at least in part on the atmospheric air pressure.

8. The method of claim 1, wherein the limit air flow rate is based at least in part on a ratio of the second air pressure over the first air pressure.

9. The method of claim 2, further comprising:
   determining a throttle operator position; and
   determining a desired throttle valve position based at least in part on the throttle operator position;
   wherein controlling the throttle valve actuator to position the throttle valve at the position being greater than or equal to the limit position comprises:
      controlling the throttle valve actuator to position the throttle valve at the desired throttle valve position if the desired throttle valve position is greater than the limit position; and
      controlling the throttle valve actuator to position the throttle valve to a position other than the desired throttle valve if the desired throttle valve position is less than the limit position, the position other than the desired throttle valve being greater than or equal to the limit position.

10. The method of claim 9, wherein:
    controlling the throttle valve actuator to position the throttle valve at the desired throttle valve position if the desired throttle valve position is greater than the limit position includes controlling the throttle valve actuator to position the throttle valve at the desired throttle valve position if the desired throttle valve position is greater than a control position of the throttle valve, the control position of the throttle valve being greater than the limit position; and
    controlling the throttle valve actuator to position the throttle valve to the position other than the desired throttle valve if the desired throttle valve position is less than the limit position includes controlling the throttle valve actuator to position the throttle valve to the control position if the desired throttle valve position is less than the control position.

11. The method of claim 9, further comprising retarding an ignition timing of the engine if the desired throttle valve position is less than the limit position.

12. The method of claim 9, further comprising stopping fuel injection if the desired throttle valve position is less than the limit position.

13. A method for controlling a forced induction engine comprising:
    determining a first air pressure upstream of an air compressor, the air compressor supplying compressed air to the engine;
    determining a second air pressure downstream of the air compressor;
    determining an engine speed;
    determining a limit position of a throttle valve of the engine based at least in part on the engine speed, the first air pressure and the second air pressure, the limit position of the throttle valve being a position of the throttle valve below which a surge limit of the air compressor is exceeded; and
    controlling a throttle valve actuator to position the throttle valve at a position being greater than or equal to the limit position.

14. The method of claim 13, further comprising determining a limit air flow rate to the engine corresponding to the surge limit of the air compressor based at least in part on the first and second air pressures; and
    wherein determining the limit position of the throttle valve of the engine is based at least in part on the limit air flow rate.

15. The method of claim 13, wherein the limit position is an idle position when a ratio of the second air pressure over the first air pressure is below a predetermined value.

16. The method of claim 13, wherein determining the first air pressure includes determining a third air pressure upstream of an air filter, the air filter being disposed upstream of the air compressor.

17. The method of claim 13, wherein determining the second air pressure includes sensing a third air pressure downstream of an air cooler, the air cooler being disposed downstream of the air compressor.

18. The method of claim 17, wherein the air cooler is disposed upstream of the throttle valve.

19. The method of claim 13, further comprising determining an atmospheric air pressure; and
    wherein the limit position of the throttle valve of the engine is based at least in part on the atmospheric air pressure.

20. The method of claim 14, wherein the limit air flow rate is based at least in part on a ratio of the second air pressure over the first air pressure.

21. The method of claim 13, further comprising:
determining a throttle operator position; and
determining a desired throttle valve position based at least in part on the throttle operator position;
wherein controlling the throttle valve actuator to position the throttle valve at the position being greater than or equal to the limit position comprises:
controlling the throttle valve actuator to position the throttle valve at the desired throttle valve position if the desired throttle valve position is greater than the limit position; and
controlling the throttle valve actuator to position the throttle valve to a position other than the desired throttle valve if the desired throttle valve position is less than the limit position, the position other than the desired throttle valve being greater than or equal to the limit position.

22. The method of claim 21, wherein:
controlling the throttle valve actuator to position the throttle valve at the desired throttle valve position if the desired throttle valve position is greater than the limit position includes controlling the throttle valve actuator to position the throttle valve at the desired throttle valve position if the desired throttle valve position is greater than a control position of the throttle valve, the control position of the throttle valve being greater than the limit position; and
controlling the throttle valve actuator to position the throttle valve to the position other than the desired throttle valve if the desired throttle valve position is less than the limit position includes controlling the throttle valve actuator to position the throttle valve to the control position if the desired throttle valve position is less than the control position.

23. The method of claim 21, further comprising retarding an ignition timing of the engine if the desired throttle valve position is less than the limit position.

24. The method of claim 21, further comprising stopping fuel injection if the desired throttle valve position is less than the limit position.

* * * * *